(12) United States Patent
Kamamoto et al.

(10) Patent No.: US 8,100,794 B2
(45) Date of Patent: Jan. 24, 2012

(54) POWER TRANSMISSION CHAIN AND POWER TRANSMISSION APPARATUS

(75) Inventors: Shigeo Kamamoto, Kashiwara (JP); Seiji Tada, Kashiba (JP)

(73) Assignee: JTEKT Corporation, Osaka (JP)

( * ) Notice: Subject to any disclaimer, the term of this patent is extended or adjusted under 35 U.S.C. 154(b) by 466 days.

(21) Appl. No.: 12/289,139

(22) Filed: Oct. 21, 2008

(65) Prior Publication Data

US 2009/0105025 A1 Apr. 23, 2009

(30) Foreign Application Priority Data

Oct. 22, 2007 (JP) .............................. P2007-273316

(51) Int. Cl.
 *F16H 7/06* (2006.01)
(52) U.S. Cl. ......... 474/157; 474/155; 474/156; 474/206
(58) Field of Classification Search .................. 474/155, 474/156, 157, 242, 206, 148, 244, 245, 229
See application file for complete search history.

(56) References Cited

U.S. PATENT DOCUMENTS

| | | | | |
|---|---|---|---|---|
| 4,010,656 | A * | 3/1977 | Jeffrey ........................... | 474/215 |
| 5,728,021 | A * | 3/1998 | van Rooij et al. ............. | 474/229 |
| 6,432,011 | B1 * | 8/2002 | Kanehira et al. .............. | 474/215 |
| 7,846,050 | B2 * | 12/2010 | Miura ........................... | 474/245 |
| 7,892,127 | B2 * | 2/2011 | Tada et al. ..................... | 474/245 |
| 2005/0202915 | A1 | 9/2005 | Pichura et al. | |
| 2007/0042849 | A1 * | 2/2007 | Tada et al. ..................... | 474/206 |
| 2007/0082517 | A1 * | 4/2007 | Lou et al. ........................ | 439/79 |
| 2007/0232430 | A1 * | 10/2007 | Yasuhara ...................... | 474/245 |
| 2008/0015070 | A1 * | 1/2008 | Miura ........................... | 474/155 |
| 2008/0161148 | A1 * | 7/2008 | Tada et al. ..................... | 474/245 |
| 2009/0233744 | A1 * | 9/2009 | Kitamura et al. ............. | 474/148 |
| 2010/0035713 | A1 * | 2/2010 | Miura et al. ................... | 474/206 |
| 2010/0279805 | A1 * | 11/2010 | Kamamoto et al. .......... | 474/148 |

FOREIGN PATENT DOCUMENTS

JP 2006-105355 (A) 4/2006
JP 2006-242374 9/2006

OTHER PUBLICATIONS

European Search Report issued on Aug. 30, 2011.

* cited by examiner

*Primary Examiner* — Emmanuel M Marcelo
(74) *Attorney, Agent, or Firm* — McGinn IP Law Group, PLLC

(57) ABSTRACT

When disposing pins of different shapes at random, pins of small involute base circle radius are made not to be arranged contiguously, pins of relatively small length are made not to be arranged contiguously, and pins of relatively outward offset are made not to be arranged contiguously.

6 Claims, 6 Drawing Sheets

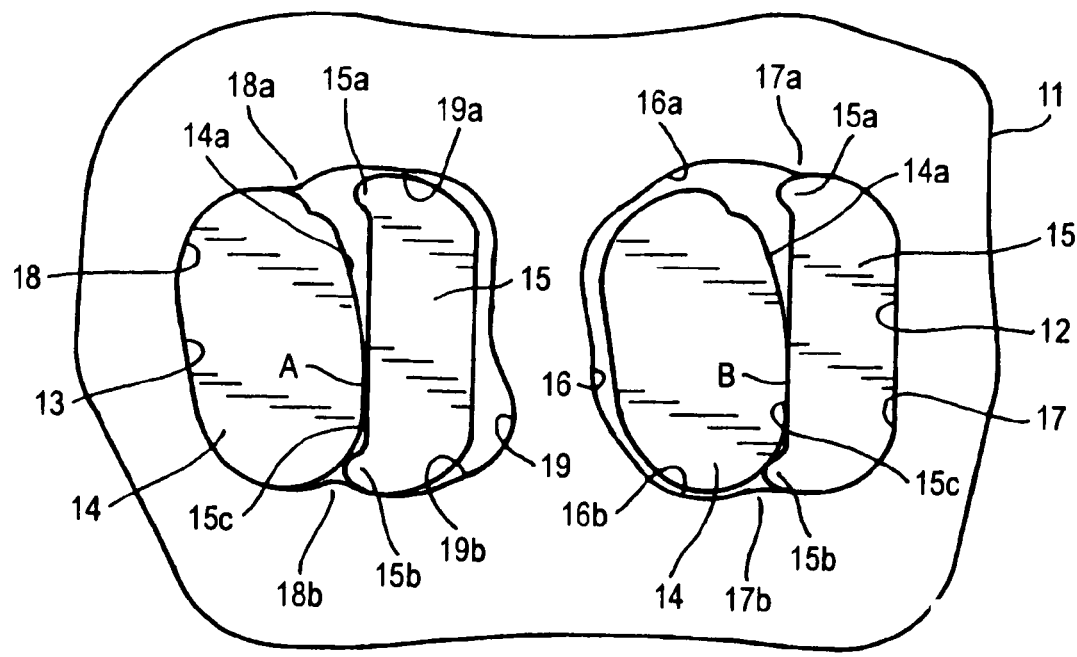
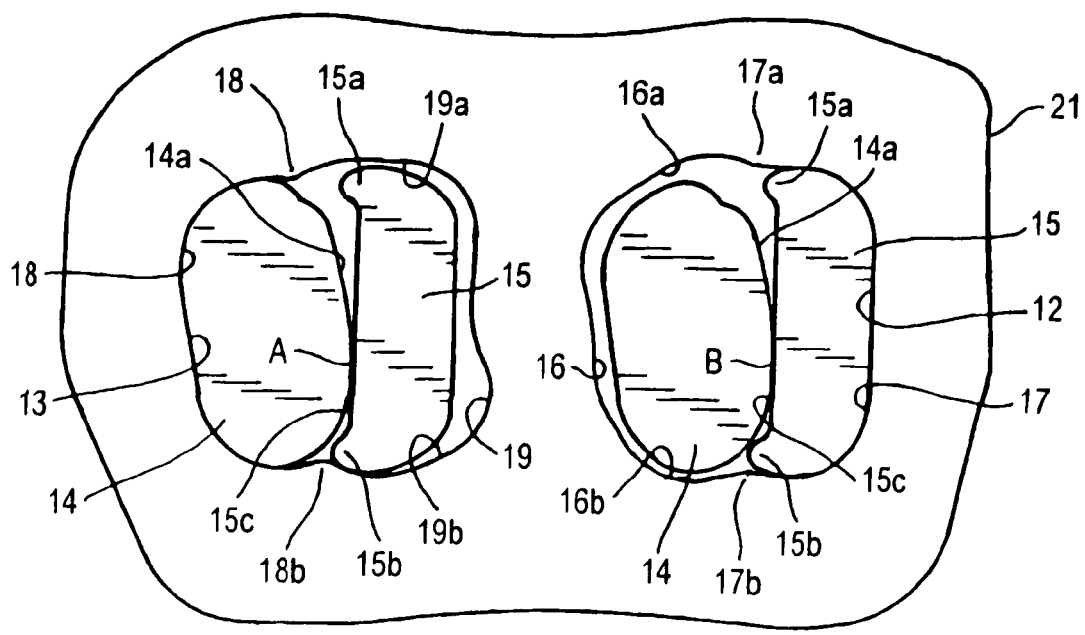

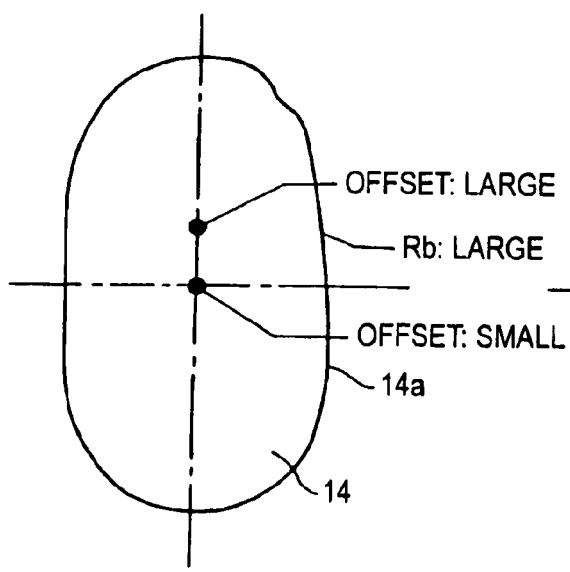 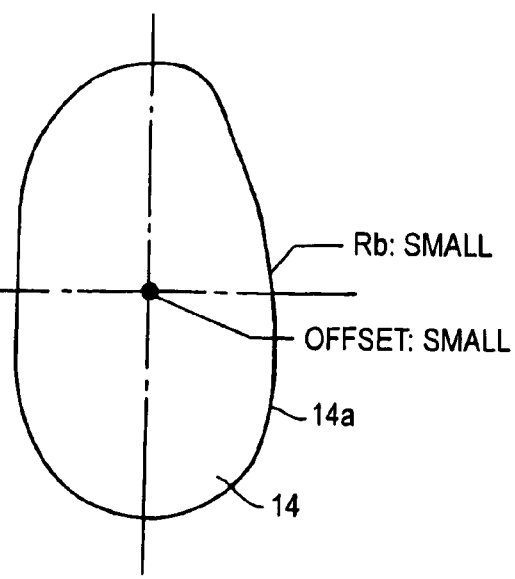
FIG. 4A                    FIG. 4B

FIG. 5A

| ARRANGEMENT POSITION NO. | 1 | 2 | 3 | 4 | 5 | 6 | 7 | 8 | 9 | 10 |
|---|---|---|---|---|---|---|---|---|---|---|
| PIN NO. | 1 | 1 | 1 | 2 | 2 | 2 | 1 | 1 | 1 | 1 |

FIG. 5B

| ARRANGEMENT POSITION NO. | 1 | 2 | 3 | 4 | 5 | 6 | 7 | 8 | 9 | 10 |
|---|---|---|---|---|---|---|---|---|---|---|
| PIN NO. | 1 | 1 | 1 | 2 | 1 | 2 | 1 | 2 | 1 | 1 |

POWER TRANSMISSION CHAIN AND POWER TRANSMISSION APPARATUS

BACKGROUND OF THE INVENTION

1. Field of the Invention

The present invention relates to a power transmission chain and more particularly to a power transmission chain and a power transmission apparatus which are suitable for a continuously variable transmission (CVT) of a vehicle such as an automotive vehicle.

2. Related Art

As an automotive continuously variable transmission, there is known an automotive continuously variable transmission, as is shown in FIG. 7, including a drive pulley (2) having a fixed sheave (2a) and a movable sheave (2b) and provided on an engine side, a driven pulley (3) having a fixed sheave (3b) and a movable sheave (3a) and provided on a drive wheel side and an endless power transmission chain (1) placed to extend between the pulleys, wherein by moving the movable sheaves (2b), (3a) towards and away from the fixed sheaves (2a), (3b) by means of a hydraulic actuator so as to clamp the chain by virtue of hydraulic pressure, so that a contact load is generated between the pulleys (2), (3) and the chain (1) by the clamping force so as to transmit torque by a frictional force generated at the contact portions between the pulleys and the chain.

As the power transmission chain, JP-A-2006-242374 proposes a power transmission chain including a plurality of links each having front and rear insertion through holes through which pins are inserted to pass, and a plurality of first pins and a plurality of second pins which are arranged in a line for connecting together the links which are arranged in a chain width direction such that the front insertion through hole of one link is associated with the rear insertion through hole of another link, a longitudinal bending of the links being enabled through relative rolling contact movement of the first pins which are fixed in the front insertion through hole of one link and fitted movably in the rear insertion through hole of another link and the second pins which are fitted movably in the insertion through hole of one link and fixed in the rear insertion through hole of another link, and wherein to reduce noise by differentiating a biting timing of the pins into the pulley, two or more pin rolling contact surface shapes and pin contact positions with the pulley surface (which are offset in the radial direction of the chain) are used and the pins which are made to differ in the way described above are arranged at random.

In the power transmission chain which is made up of the links and pins, in a biting position where the pins shift from a straight line portion to a circular arc-like portion where the pins come into contact with the pulley, the tangential direction of the pulley and the traveling direction of the pins differ, and the pins are made to be brought into contact with the pulley while traveling downwards. Then, the pins staying in the straight line portion are also affected by the downward traveling motion of the pins in the biting position and are then caused to move vertically, and polygonal vibration is generated by the pins repeating the vertical movement. In addition, when the pins are disposed at equal intervals, by the pins coming into contact with the pulley in a constant cycle, a primary peak of collision frequency becomes large and causes uncomfortable noise to the ears.

In the power transmission chain disclosed in JP-A-2006-242374 above, by the basic configuration which reduces the polygonal vibration and random arrangement of the pins, the reduction in vibration and noise is realized. However, the approach of arranging the different types of pins at random to differentiate the biting timing of the pins into the pulley tends to increase the polygonal vibration, and it is difficult to make compatible the reduction in primary peak with the reduction in polygonal vibration by the random arrangement.

SUMMARY OF THE INVENTION

An object of the invention is to provide a power transmission chain and a power transmission apparatus which can reduce the polygonal vibration in such a state that the primary peak reduction effect by the random arrangement is maintained.

According to an aspect of the invention, there is provided a power transmission chain including a plurality of links each having front and rear insertion through holes through which pins are inserted to pass, and a plurality of first pins and a plurality of second pins which are arranged in a line for connecting together the links which are arranged in a chain width direction such that the front insertion through hole of one link is associated with the rear insertion through hole of another link, a longitudinal bending of the links being enabled through relative rolling contact movement of the first pins and the second pins, the pins used having different shapes to differentiate a biting timing of the pins into a pulley, wherein regarding the shapes of the pins, at least one of combinations is used of a relatively large rolling contact surface curvature and a relative small rolling contact surface curvature, a relatively long length and a relatively short length, and a relatively inward offset and a relatively outward offset with respect to a radial direction of the chain, such that pins of relatively small rolling contact surface are not arranged contiguously, pins of relatively small length are not arranged contiguously, and pins of relatively outward offset with respect to the radial direction of the chain are not arranged contiguously.

In the power transmission chain of the aspect of the invention, at least either of the first pins and the second pins is brought into contact with the pulley for power transmission through frictional force. In a transmission chain in which either of first pins and second pins is brought into contact with a pulley, either of the first pins and the second pins is made to be pins which are brought into contact with the pulley (hereinafter, referred to as "first pins" or "pins") when they are used in a continuously variable transmission, while the other pins are made to be pins which are not brought into contact with the pulley (referred to as inter-pieces or strips, and hereinafter, referred to as "second pins" or "inter-pieces). Normally, it is only the first pins that pin shapes are changed, and a rolling contact surface of the second pin is made into a flat surface, while a rolling contact surface of the first pin is formed into an involute curved plane which enables a relative rolling contact movement. However, the first pin and the second pin may each be such that a contact surface thereof is formed into a required curved plane.

The pin of relatively large rolling contact surface curvature and the pin of relatively small rolling contact surface curvature can be obtained by increasing or decreasing an involute base circle radius Rb, and the pin of relatively long length and the pin of the relatively short length can be obtained by changing only the length of pins while maintaining the same their sectional shapes and end face shapes. In addition, the offsets in the radial direction of the chain can be obtained by offsetting a center of crowning on the pin end face in predetermined directions. The contact position of the pin in which the offset in the radial direction of the chain lies relatively inwards is preferably made to lie at the center of the pin (offset is 0) or substantially at the center of the pin (offset is substantially 0).

Of the pin of relatively large contact surface curvature and the pin of relatively small contact surface curvature, the pin of relatively large contact surface curvature is used more, and of the pin of relatively long length and the pin of relatively short length, the pin of relatively long length is used more. In addition, of the pin of relatively inward offset and the pin of relatively outward offset with respect to the radial direction of the chain, the pin of relatively inward offset is used more.

Regarding shapes of pins to be used, conventionally, at least one of combinations is used of a relatively large rolling contact surface curvature and a relative small rolling contact surface curvature, a relatively long length and a relatively short length, and a relatively inward offset and a relatively outward offset with respect to a radial direction of the chain, and the pins of those shapes are arranged at random. In the conventional random arrangement, from the viewpoint of "at random," even with a pin of pins of such a combination which is used relatively less, there was a case where such less used pins were disposed contiguously in a certain location. However, when carrying out an analysis regarding polygonal vibration, it was found out that an increase in polygonal vibration was caused by the contiguous arrangement of pins of relatively small involute base circle radius, the contiguous arrangement of pins of relatively small length and the contiguous arrangement of pins of relatively outward offset with respect to the radial direction of the chain. Then, in this invention, the contiguous arrangements of those pins which cause the increase in polygonal vibration are eliminated, whereby the polygonal vibration is reduced while maintaining the primary peak reduction effect by the random arrangement.

In addition, regarding pitch length, a link of small pitch length and a link of large pitch length are used so as to realize two types of pitch lengths, whereby the primary peak is reduced further.

It is preferable that one of the first pin and the second pin is fixed in a pin fixing portion provided in a front part of the front insertion through hole of one link and is movably fitted in a pin movable portion provided in a front part of the rear insertion through hole of another link, whereas the other of the first pin and the second pin is movably fitted in a pin movable portion provided in a rear part of the front insertion through hole of one link and is fixed in a pin fixing portion provided in a rear part of the rear insertion through hole of another link.

The pin is fixed in the pin fixing portion, for example, such that an outer circumferential surface of the pin is fitted in an inner edge of the pin fixing portion through mechanical press fit to be fixed therein. However, in place of this, the pin may be fixed in the pin fixing portion through shrink fitting or cooling fitting. The fitting and fixing of the pin is preferably implemented on edges (upper and lower edges) of a portion which intersects a longitudinal direction of the pin fixing portion at right angles. After the pin has been fitted and fixed in place in the way described above, by imparting a pretension at a pretension imparting step, a uniform and proper residual compression stress is imparted to the pin fixing portion (the pin press fit portion) of the link.

The links are made of, for example, spring steel or carbon tool steel. The material of the links is not limited to the spring steel or carbon tool steel, and hence, other steels such as bearing steel may be used. In the link, the front and rear insertion through holes may be made up of independent through holes (a pillared link) or the front and rear insertion through holes may be made of a single through hole (a pillar-less link). An appropriate material such as bearing steel is used as the material of the pins.

In addition, in this specification, while one longitudinal end side of the link is referred to as front whereas the other end side as rear, they are so referred as a matter of convenience, and hence, it does not always mean that the length direction of the link coincides with the longitudinal or front to rear direction of the link.

In the power transmission chain, either (the inter-piece) of the pins is made shorter than the other pin (the pin), and end faces of the longer pin are preferably brought into contact with conical sheave surfaces of the pulley of the continuously variable transmission, so as to transmit power via frictional force produced by the contact. Each pulley is made up of a fixed sheave having a conical sheave surface and a movable sheave having a conical sheave surface which confronts oppositely the sheave surface of the fixed sheave, so as to hold the chain between the sheave surfaces of both the sheaves. Then, the movable sheave is moved by a hydraulic actuator so as to change a wrap contact radius of the chain in accordance with an inter-sheave distance of the continuously variable transmission, whereby a continuously variable gear change can be implemented through smooth movements of the constituent members involved.

According to another aspect of the invention, there is provided a power transmission apparatus including a first pulley having conical sheave surfaces, a second pulley having conical sheave surfaces, and a power transmission chain placed to extend between the first and second pulleys, wherein the power transmission chain is the power transmission chain that has been described just above.

This power transmission apparatus is preferable for use as a continuously variable transmission of a vehicle such as an automotive vehicle.

According to the power transmission chain and the power transmission apparatus of the aspects of the invention, the contiguous arrangements of the pins which cause the increase in polygonal vibration (the contiguous arrangement of pins or relatively small involute base circle radius, the contiguous arrangement of pins of relatively short length and the contiguous arrangement of pins of relatively outward offset with respect to the radial direction of the chain) are eliminated, whereby the polygonal-vibration is reduced while maintaining the primary peak reduction effect by the random arrangement.

BRIEF DESCRIPTION OF THE DRAWINGS

FIG. 2 is an enlarged side view showing basic shapes of a link, pin and inter-piece.

FIG. 3 is an enlarged side view showing a shape of a link having a different pitch length.

FIGS. 4A and 4B show enlarged side views showing pins having different shapes.

FIG. 5A shows an example of a conventional arrangement of pins and FIG. 5B shows an example of arrangement of pins according to the invention.

DETAILED DESCRIPTION OF THE PREFERRED EMBODIMENTS

Hereinafter, an embodiment of the invention will be described by reference to the drawings. When used in the following description, upper and lower are used based on a vertical positional relationship represented in FIG. 2.

Figure 1:
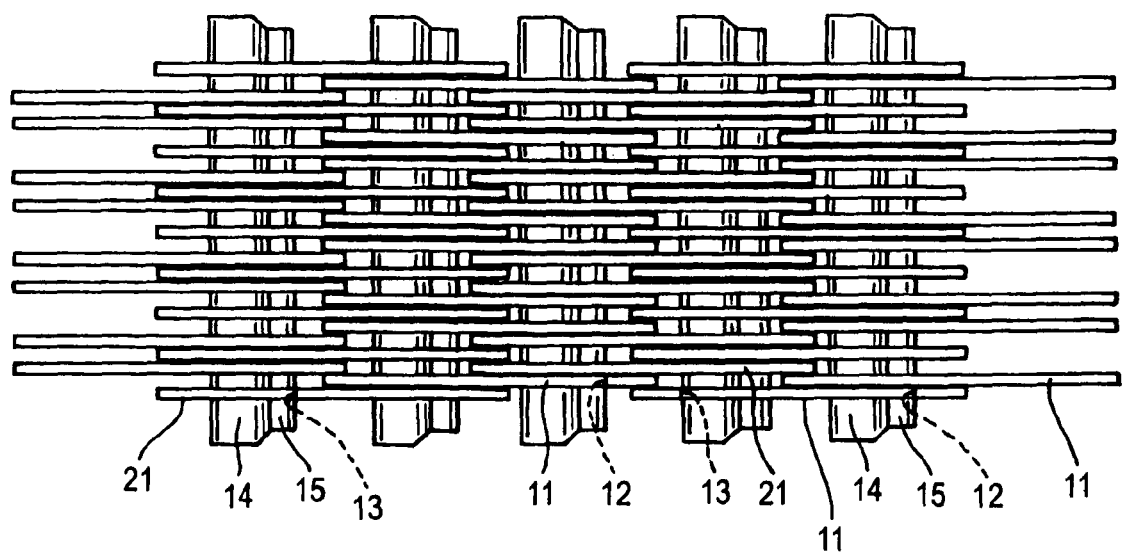
FIG. 1 is a plan view showing part of a first embodiment of a power transmission chain according to the invention.

FIG. 1 shows part of a power transmission chain according to the invention, and a power transmission chain (1) includes a plurality of links (11), (21) each having front and rear insertion through holes (12), (13) which are provided at a predetermined interval in a length direction of the chain and pluralities of pins (first pins) (14) and inter-pieces (second pins) (15) which connect the links (11), (21) which are arranged in a width direction of the chain in such a manner as to bend in the longitudinal direction. The inter-piece (15) is made shorter than the pin (14), and the inter-piece and the pin are made to face oppositely in such a state that the inter-piece (15) is disposed forwards whereas the pin (14) is disposed rearwards.

In the power transmission chain (1) of the invention, as to the links (11), (21), two types of links are prepared: a link (11) shown in FIG. 2 and a link (21) shown in FIG. 3. As to sectional shapes of the pin (14), two types of sectional shapes shown in FIGS. 4A and 4B are used.

In the chain (1), three rows of links each made up of a plurality of links of the shame phase in the width direction are arranged in a traveling direction (a front to rear or longitudinal direction) so as to make a link unit, and a plurality of link units each made up of the three rows of links are connected in the traveling direction. In this embodiment, a link row of nine links and two link rows of eight links are made to make one link unit.

As is shown in FIGS. 2 and 3, the front insertion through hole (12) of the links (11), (21) is made up of a pin movable portion (16) into which the pin (14) is fitted movably and an inter-piece fixing portion (17) where the inter-piece (15) is fixed, whereas the rear insertion through hole (13) is made up of a pin fixing portion (18) where the pin (14) is fixed and an inter-piece movable portion (19) in which the inter-piece (15) is fitted movably.

Each pin (14) is made wider in the longitudinal direction than the inter-piece (15), and projecting edge portions (15a), (15b) are provided at upper and lower edge portions of the inter-piece (15) in such a manner as to extend to the pin (14) side.

When connecting the links (11), (21) which are arranged in the width direction of the chain, the links (11), (21) are stacked together such that the front insertion through hole (12) of one link (11), (21) is associated with the rear insertion through hole (13) of another link (11), (21), and the pin (14) is fixed in the rear insertion through hole (13) of one link (11), (21) and is fitted movably in the front insertion through hole (12) of another link (11), (21), whereas the inter-piece (15) is fitted movably in the rear insertion through hole (13) of one link (11), (21) and is fixed in the front fixing portion (12) of another link (11), (21). Then, by the pin (14) and the inter-piece (15) moving relatively through rolling contact, the links (11), (21) are allowed to bend in a length direction (a longitudinal direction).

Upper and lower convex arc-shaped holding portions (18a), (18b) are provided at a boundary portion between the pin fixing portion (18) and the inter-piece movable portion (19) of the link (11), (21) in such a manner as to be contiguous, respectively, to upper and lower concave arc-shaped guide portions (19a), (19b) of the inter-piece movable portion (19) and to hold the pin (14) which is fixed in the pin fixing portion (18). Similarly, upper and lower convex arc-shaped holding portions (17a), (17b) are provided at a boundary portion between the inter-piece fixing portion (17) and the pin movable portion (16) in such a manner as to be contiguous, respectively, to upper and lower concave arc-shaped guide portions (16a), (16b) of the pin movable portion (16) and to hold the inter-piece (15) which is fixed in the inter-piece fixing portion (17).

A locus of a contact position between the pin (14) and the inter-piece (15) based on the pin (14) is made into an involute of a circle, and in this embodiment, a rolling contact surface (14a) of the pin (14) is made into an involute curve having a base circle of a radius Rb and a center M in section, whereas a rolling contact surface (15c) of the inter-piece (15) is made into a flat plane (a sectional shape is a straight line). By this configuration, when each link (11), (21) shifts from a straight line area to a curve area of the chain (1)) or from the curve area to the straight line area, in the front insertion through hole (12), the pin (14) moves within the pin movable portion (16) relative to the inter-piece (15) which is in the fixed state while the rolling contact surface (14a) of the pin (14) is being brought into rolling contact with the rolling contact surface (15c) of the inter-piece (15) (including slight sliding contact), whereas in the rear insertion through hole (13), the inter-piece (15) moves within the inter-piece movable portion (19) relative to the pin (14) which is in the fixed state while the rolling contact surface (15c) of the inter-piece (15) is being brought into rolling contact with the rolling contact surface (14a) of the pin (14) (including slight sliding contact).

Although polygonal vibration is generated by a pin repeating its vertical movement, this causing noise, in this power transmission chain (1), the pin (14) and the inter-piece (15) move relatively while in rolling contact with each other, and the locus of the contact position between the pin (14) and the inter-piece (15) based on the pin (14) is made into the involute of a circle, whereby vibration can be reduced to thereby reduce noise, compared with a case where both the contact surfaces of the pin and the inter-piece are formed into an arc-shaped surface.

In order to reduce noise and vibration further, two or more types of links (11), (21) having different shapes are preferably arranged at random, whereby a cycle at which striking noise is generated is offset to thereby be dispersed into frequency bands having different sound energies, whereby a peak of sound pressure level is reduced.

In FIGS. 2 and 3, portions denoted by reference characters A and B are a line (a point in section) where the pin (14) and the inter-piece (15) are in contact in the straight line area of the chain (1), and a distance between A and B is a pitch length. The link (21) in FIG. 3 is such that the distance between A and B (the pitch length) is increased relative to the link (11) shown in FIG. 2, and for the links (11), (21), a link of large pitch length and a link of small pitch length are both used.

In FIGS. 4A and 4B, as to an involute curve base circle radius Rb of the pin (14), two types of radii are used: a large involute curve base circle radius shown in FIG. 4A and a small involute curve base circle radius shown in FIG. 4B. These two types of pins (14) can be inserted to pass through either of the link (11) of small pitch length shown in FIG. 2 and the link (21) of large pitch length shown in FIG. 3, and hence, four types of combinations are made to be available by combining the two types of links (11) of different pitch lengths and the two types of pins of different shapes. In addition, the link (11) of small pitch length and the pin (14) of large involute curve base circle radius constitute a basic link and a basic pin and hence are used more than the link (21) of large pitch length and the pin (14) of small involute curve base circle radius.

In FIG. 4A, large and small offsets indicated by points show in the figure contact positions with pulleys (2), (3), and the large offset denotes an offset which is relatively outward with respect to the radial direction of the chain and the small offset denotes an offset which is relatively inward with respect to the radial direction of the chain. As to shapes of pins (14) to be used, in addition to pins of large and small base circle radii Rb, pins of inward offset (small offset) and outward offset (large offset) are also used as required. In addition, although illustration is omitted, a relatively long pin (14) and a relatively short pin (14), which are identical in cross sectional and end face shapes but are different in length, are also used as required.

FIGS. 5A and 5B show examples of arrangements of pins (14), and pin No. 1 denotes a pin of large base circle radius Rb and pin No. 2 denotes a pin of small Rb. When paying attention to arrangement of pins (14), in the conventional random arrangement, even with the pin of small Rb which is used relatively less compared with the pin of large Rb, there was a case where two or more such less used pins were disposed contiguously in a certain location. However, as a result of an analysis carried out regarding polygonal vibration, it was found out that the contiguous arrangement of pins of small involute base circle radius Rb caused an increase in polygonal vibration. Namely, in FIG. 5A, three pins (14) of small Rb which are denoted by pin No. 2 are disposed in succession in arrangement position Nos. 4 to 6, and the arrangement like this constitutes an NG arrangement. In this case, pin No. 2 in arrangement position No. 5 and pin No. 1 in arrangement position No. 8 switch arrangement positions, so as to realize an arrangement shown in FIG. 5B, whereby the contiguous arrangement of the pins in question which causes an increase in polygonal vibration can be eliminated without changing the numbers of the respective types of pins. As a result, the arrangement shown in FIG. 5B constitutes an OK arrangement which can reduce polygonal vibration while maintaining the primary peak reduction effect by the random arrangement. In addition, even in the event that only two pins of small Rb which are indicated by pin No. 2 are arranged contiguously, the arrangement constitutes an NG arrangement.

In FIGS. 5A and 5B, when pin Nos. 1 and 2 denote long and short pins, respectively, as with what has been described above with respect to base circle radius Rb, by eliminating a contiguous arrangement of pins No. 2, an OK arrangement can be realized which can reduce polygonal vibration while maintaining the primary peak reduction effect by the random arrangement. Similarly, when pin Nos. 1 and 2 denote pins of inward offset (small offset) and outward offset (large offset), respectively, by eliminating a contiguous arrangement of pins No. 2, an OK arrangement can be realized which can reduce polygonal vibration while maintaining the primary peak reduction effect by the random arrangement.

Figure 6:
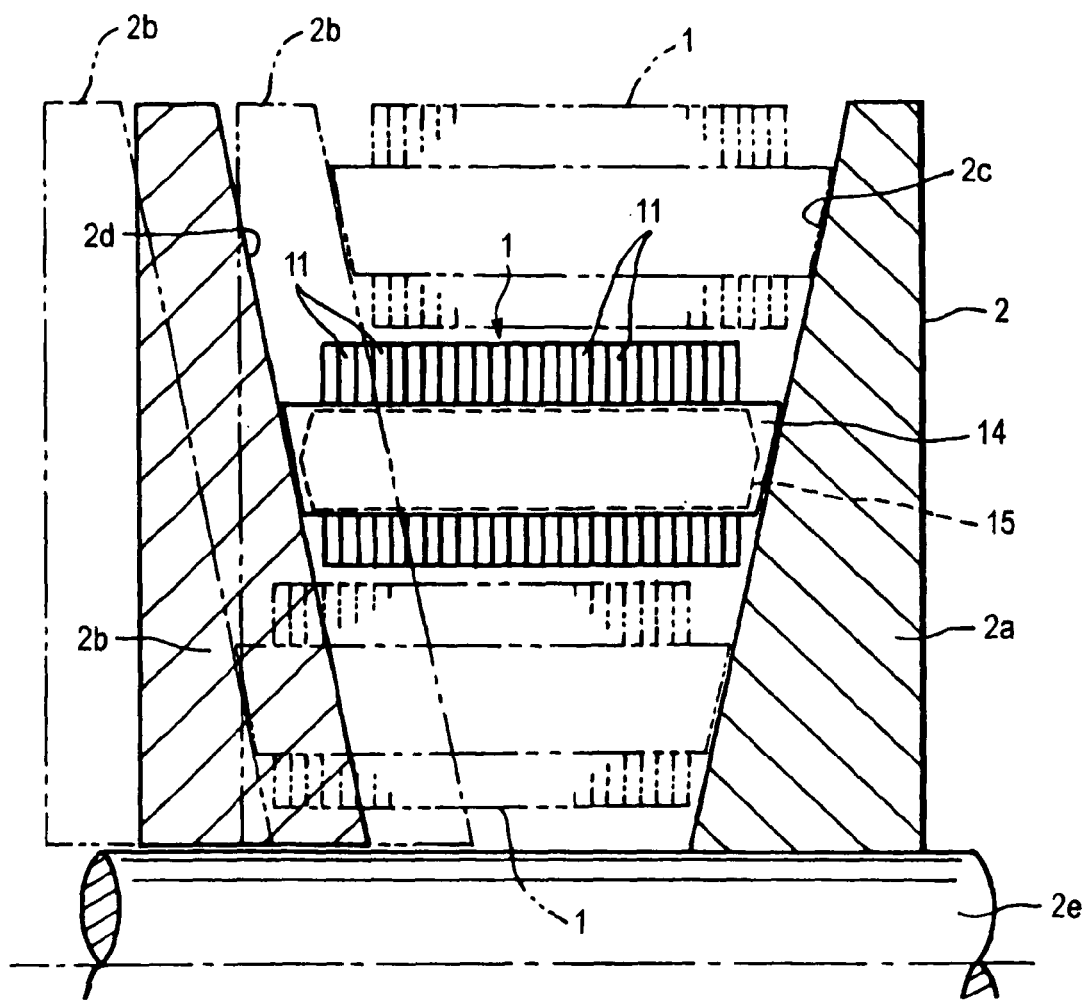
FIG. 6 is a front view showing a state in which the power transmission chain is mounted on a pulley.
Figure 7:
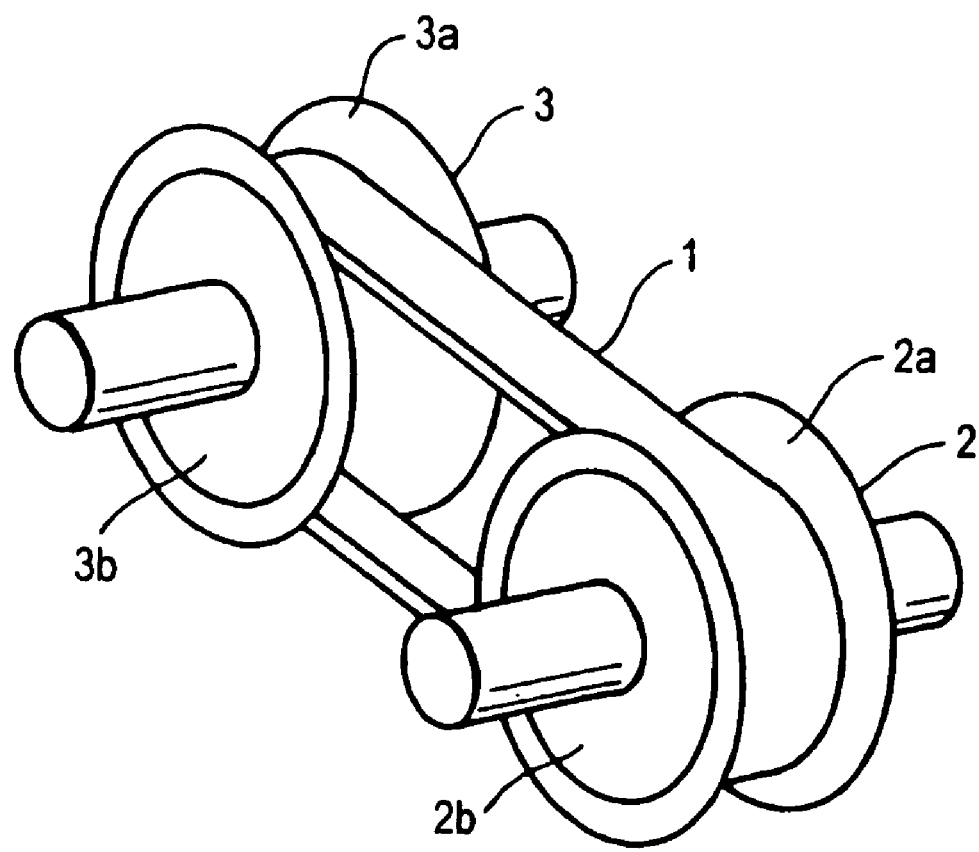
FIG. 7 is a perspective view showing a continuously variable transmission.

This power transmission chain (1) is used in a V-type pulley CVT shown in FIG. 7, and as this occurs, as is shown in FIG. 6, in such a state that (2), end faces of the inter-piece 15 do not contact respective conical sheave surfaces (2c), (2d) of a fixed sheave (2a) and a movable sheave (2b) of a pulley (2) having a pulley shaft (2e), end faces of the drive pin (14) contact the conical sheave surfaces (2c), (2d) of the pulley, and power is transmitted by a frictional force produced by the contact.

When the movable sheave (2b) of the drive pulley (2) which lies in a position indicated by solid lines is moved towards or apart from the fixed sheave (2a), a wrap contact diameter of the drive pulley (2) is, as is shown by chain lines, increased when the movable sheave is moved towards the fixed sheave, whereas the wrap contact diameter is reduced when the movable sheave is moved apart from the fixed sheave. Although the illustration thereof is omitted, in the driven pulley (3), a movable sheave moves in an opposite direction to the movable sheave (2b) of the drive pulley (2), and a wrap contact diameter of the driven pulley (3) is reduced when the wrap contact diameter of the drive pulley (2) is increased, whereas when the wrap contact diameter of the drive pulley (2) is reduced, the wrap contact diameter of the driven pulley (3) is increased. As a result of this, based on a state in which a speed ratio of one to one is achieved (an initial value), an U/D (under drive) state is obtained with a minimum wrap contact diameter of the drive pulley (2) and a maximum wrap contact diameter of the driven pulley (3), and an O/D (overdrive) state is obtained with a maximum wrap contact diameter of the drive pulley (2) and a minimum wrap contact diameter of the driven pulley (3).

What is claimed is:

1. A power transmission chain comprising:
   a plurality of links each including front and rear insertion through holes through which pins are inserted to pass, and
   a plurality of first pins and a plurality of second pins which are arranged in a line for connecting together the links which are arranged in a chain width direction such that the front insertion through hole of one link is associated with the rear insertion through hole of another link, a longitudinal bending of the links being enabled through relative rolling contact movement of the first pins and the second pins, the pins used comprising different shapes to differentiate a biting timing of the pins into a pulley,
   wherein, at least one of the following combinations in the shapes of the pins is used of a relatively large rolling contact surface curvature and a relatively small rolling contact surface curvature, and a relatively inward offset and a relatively outward offset with respect to a radial direction of the chain, such that none of the pins of relatively small rolling contact surface is arranged contiguously, and none of the pins of relatively outward offset with respect to the radial direction of the chain is arranged contiguously.

2. A power transmission apparatus comprising:
   a first pulley including conical sheave surfaces;
   a second pulley including conical sheave surfaces; and
   a power transmission chain placed to extend between the first and second pulleys,
   wherein the power transmission chain is the power transmission chain set forth in claim 1.

3. A power transmission chain according to claim 1, wherein the pins comprise the pins including the relatively inward offset and the pins including the relatively outward offset with respect to the radial direction of the chain, such that the none of the pins of relatively outward offset with respect to the radial direction of the chain is arranged contiguously in a chain length direction.

4. A power transmission chain according to claim 1, wherein the pins comprise the pins including the relatively large rolling contact surface curvature and the pins including the relatively small rolling contact surface curvature, such that none of the pins of relatively small rolling contact surface is arranged contiguously in a chain length direction.

5. A power transmission chain according to claim 1, wherein the plurality of links include links with a relatively small pitch length and links with a relatively large pitch length.

6. A power transmission chain comprising:
   a plurality of links each including front and rear insertion through holes through which pins are inserted to pass, and
   a plurality of first pins and a plurality of second pins which are arranged in a line for connecting together the links which are arranged in a chain width direction such that the front insertion through hole of one link is associated with the rear insertion through hole of another link, a longitudinal bending of the links being enabled through relative rolling contact movement of the first pins and the second pins, the pins used comprising different shapes to differentiate a biting timing of the pins into a pulley, wherein, the pins comprise pins including a relatively inward offset and pins including a relatively outward offset with respect to a radial direction of the chain, such that none of the pins of relatively outward offset with respect to the radial direction of the chain is arranged contiguously.

* * * * *